United States Patent
Wu et al.

(10) Patent No.: US 12,550,054 B2
(45) Date of Patent: Feb. 10, 2026

(54) MOBILITY FOR SMALL DATA TRANSMISSION PROCEDURE

(71) Applicant: Nokia Technologies Oy, Espoo (FI)

(72) Inventors: Chunli Wu, Beijing (CN); Samuli Turtinen, Oulu (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 331 days.

(21) Appl. No.: 18/248,177

(22) PCT Filed: Oct. 10, 2020

(86) PCT No.: PCT/CN2020/120217
§ 371 (c)(1),
(2) Date: Apr. 6, 2023

(87) PCT Pub. No.: WO2022/073237
PCT Pub. Date: Apr. 14, 2022

(65) Prior Publication Data
US 2023/0388919 A1 Nov. 30, 2023

(51) Int. Cl.
*H04W 48/20* (2009.01)
*H04W 76/27* (2018.01)

(52) U.S. Cl.
CPC .......... *H04W 48/20* (2013.01); *H04W 76/27* (2018.02)

(58) Field of Classification Search
CPC ..... H04W 52/02; H04W 76/27; H04W 76/28; H04W 36/00; H04W 76/19; H04W 76/20; H04W 48/20
See application file for complete search history.

(56) References Cited

U.S. PATENT DOCUMENTS 10,687,354 B2    6/2020  Li et al.
2018/0092157 A1  3/2018  Chen
(Continued)

FOREIGN PATENT DOCUMENTS

CN    107371206 A    11/2017
CN    111083752 A    4/2020
(Continued)

OTHER PUBLICATIONS

"Work Item on NR smalldata transmissions in Inactive state", 3GPP TSG RAN Meeting #86, RP-193252, Agenda: 9.1.2, ZTE Corporation, Dec. 9-12, 2019, 4 pages.
(Continued)

*Primary Examiner* — Michael A Faragalla
(74) *Attorney, Agent, or Firm* — Lippes Mathias LLP

(57) ABSTRACT

Embodiments of the present disclosure relate to mobility for small data transmission (SDT) procedure. The first device, which is in an inactive state and served in a first cell of the second device, performs a session of small data transmission between the first device and the second device. The first device determines whether a potential cell reselection criterion is satisfied when the session of small data transmission is ongoing. If a potential cell reselection criterion is satisfied, the first device transmits, to the second device, first information indicating an intention of cell reselection. As such, if the cell reselection happens during SDT procedure, the second device is able to put the first device into either the inactive state or the connected state. Accordingly, already transmitted data is not lost in case cell reselection happens before the session of small data transmission is completed.

12 Claims, 7 Drawing Sheets

(56) References Cited

U.S. PATENT DOCUMENTS

| | | | |
|---|---|---|---|
| 2018/0176834 A1 | 6/2018 | Wei et al. | |
| 2018/0270713 A1 | 9/2018 | Park et al. | |
| 2020/0128484 A1* | 4/2020 | Su | H04W 48/20 |
| 2020/0163148 A1 | 5/2020 | Futaki et al. | |
| 2020/0205216 A1 | 6/2020 | Tseng et al. | |

FOREIGN PATENT DOCUMENTS

| | | |
|---|---|---|
| WO | 2013/038052 A1 | 3/2013 |
| WO | 2017/095809 A1 | 6/2017 |
| WO | 2020/191059 A1 | 9/2020 |

OTHER PUBLICATIONS

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Services and System Aspects; Feasibility Study on New Services and Markets Technology Enablers; Stage 1 (Release 14)", 3GPP TR 22.891, V14.2.0, Sep. 2016, pp. 1-95.

"Common aspects between RACH and CG-based scheme", 3GPP TSG-RAN WG2 Meeting #111-e, R2-2006582, Agenda: 8.6.2, Huawei, Aug. 17-28, 2020, pp. 1-14.

"Cell Reselection in Enhanced CELL_FACH State for LCR TDD", 3GPP TSG-RAN WG2#62bis, R2-083377, Agenda: 7.4.5, CATT, Jun. 30-Jul. 4, 2008, pp. 1-4.

"3rd Generation Partnership Project; Technical Specification Group Core Network and Terminals; Non-Access-Stratum (NAS) protocol for 5G System (5GS); Stage 3; (Release 17)", 3GPP TS 24.501, V17.0.0, Sep. 2020, pp. 1-729.

"IEEE 802.11", Wikipedia, Retrieved on Apr. 4, 2023, Webpage available at : https://en.wikipedia.org/wiki/IEEE_802.11.

International Search Report and Written Opinion received for corresponding Patent Cooperation Treaty Application No. PCT/CN2020/120217, dated Jul. 19, 2021, 9 pages.

"General Considerations on Small Data Transmission", 3GPP TSG-RAN WG2 Meeting#111-electronic, R2-2006550, Agenda: 8.6.2, vivo, Aug. 17-28, 2020, 6 pages.

"Small Data Transmission over pre-configured PUSCH resources", 3GPP TSG-RAN WG2 Meeting#111e, R2-2007489, Agenda: 8.6.2, Nokia, Aug. 17-28, 2020, 5 pages.

Extended European Search Report received for corresponding European Patent Application No. 20956552.2, dated Jun. 6, 2024, 9 pages.

"Location update at RAN-based notification area boundary", 3GPP TSG-RAN WG2 #98, R2-1705269, Agenda: 10.4.1.6, NEC, May 15-19, 2017, 5 pages.

Office Action received for corresponding Chinese Patent Application No. 202080107833.1, dated Jul. 19, 2024, 7 pages of Office Action and no page of translation available.

\* cited by examiner

MOBILITY FOR SMALL DATA TRANSMISSION PROCEDURE

RELATED APPLICATION

This application claims priority to PCT Application No. PCT/CN2020/120217, filed on Oct. 10, 2020, which is incorporated herein by reference in its entirety.

FIELD

Embodiments of the present disclosure generally relate to the field of telecommunication and in particular, to methods, devices, apparatuses and computer readable storage medium for mobility for a small data transmission procedure.

BACKGROUND

In some communication systems, a terminal device can transition between an inactive state and a connected state. In the inactive state, the terminal device may not have a connection established with a network device for communications. To avoid unnecessary signaling overhead and power consumption for establishing or reestablishing a connection, it has been agreed to support small data transmission (SDT) for a terminal device in the inactive state, without requiring the terminal device to establish a connection with a network device.

Further, the terminal device in the inactive state may send multiple uplink packets and receive multiple downlink packets as part of SDT and without transitioning to a connected state on a dedicated grant. That is, the terminal device transmits multiple packets during a same SDT procedure without transitioning into the connected state in between or performing separate SDT procedures for the transmissions.

SUMMARY

In general, example embodiments of the present disclosure provide a solution of mobility for a SDT procedure.

In a first aspect, there is provided a first device. The first device comprises at least one processor; and at least one memory including computer program code; the at least one memory and the computer program code are configured to, with the at least one processor, cause the device to perform a session of small data transmission between the first device and a second device, the first device being in an inactive state and served in a first cell of the second device; determine whether a potential cell reselection criterion is satisfied when the session of small data transmission is ongoing, and in accordance with a determination that a potential cell reselection criterion is satisfied, transmit, to the second device, first information indicating an intention of cell reselection.

In a second aspect, there is provided a second device. The second device comprises at least one processor; and at least one memory including computer program code; the at least one memory and the computer program code are configured to, with the at least one processor, cause the device to perform a session of small data transmission between a first device and the second device, the first device being in an inactive state and served in a first cell of the second device; and receive, from the first device, first information indicating an intention of cell reselection.

In a third aspect, there is provided a third device. The third device comprises at least one processor; and at least one memory including computer program code; the at least one memory and the computer program code are configured to, with the at least one processor, cause the device to receive, from a first device, an indication of whether a session of small data transmission was ongoing between the first device and the second device in a first cell of the second device; and in accordance with a determination that the first device switches from the first cell to a second cell of the third device, receive, from the second device, data of the session of the small data transmission, the data being transmitted to the second device while the first device was served in the first cell.

In a fourth aspect, there is provided a method. The method comprises performing, at a first device, a session of small data transmission between the first device and a second device, the first device being in an inactive state and served in a first cell of the second device; determining whether a potential cell reselection criterion is satisfied when the session of small data transmission is ongoing; and in accordance with a determination that a potential cell reselection criterion is satisfied, transmitting, to the second device, first information indicating an intention of cell reselection.

In a fifth aspect, there is provided a method. The method comprises performing, at a second device, a session of small data transmission between a first device and the second device, the first device being in an inactive state and served in a first cell of the second device; and receiving, from the first device, first information indicating an intention of cell reselection.

In a sixth aspect, there is provided a method. The method comprises receiving, at a third device and from a first device, an indication of whether a session of small data transmission was ongoing between the first device and the second device in a first cell of the second device; and in accordance with a determination that the first device switches from the first cell to a second cell of the third device, receiving, from the second device, data of the session of the small data transmission, the data being transmitted to the second device while the first device was served in the first cell.

In a seventh aspect, there is provided a first apparatus. The first apparatus comprises means for performing a session of small data transmission between the first apparatus and a second apparatus, the first apparatus being in an inactive state and served in a first cell of the second apparatus; means for determining whether a potential cell reselection criterion is satisfied when the session of small data transmission is ongoing, and means for in accordance with a determination that a potential cell reselection criterion is satisfied, transmitting, to the second apparatus, first information indicating an intention of cell reselection.

In an eighth aspect, there is provided a second apparatus. The second apparatus comprises means for performing a session of small data transmission between a first apparatus and the second apparatus, the first apparatus being in an inactive state and served in a first cell of the second apparatus; and means for receiving, from the first apparatus, first information indicating an intention of cell reselection.

In a ninth aspect, there is provided a third apparatus. The third apparatus comprises means for receiving, from a first apparatus, an indication of whether a session of small data transmission was ongoing between the first apparatus and the second apparatus in a first cell of the second apparatus; and means for in accordance with a determination that the first apparatus switches from the first cell to a second cell of the third apparatus, receiving, from the second apparatus, data of the session of the small data transmission, the data being transmitted to the second apparatus while the first apparatus was served in the first cell.

In a tenth aspect, there is provided a computer-readable medium comprising program instructions for causing an apparatus to perform at least the method according to any one of the above fourth to sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
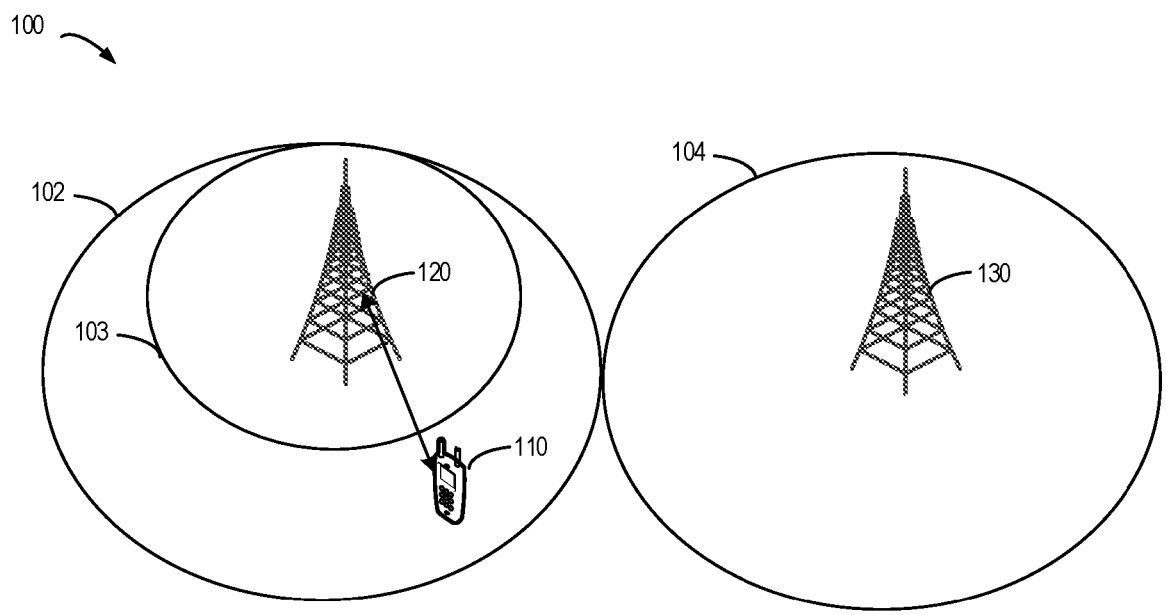
FIG. 1 illustrates an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), an integrated access and backhaul (IAB) node, a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

Example Environment

Reference is first made to FIG. 1, which illustrates an example communication network in which example embodiments of the present disclosure can be implemented. FIG. 1 shows an example communication network 100 in which example embodiments of the present disclosure can be implemented. In the example communication network 100, a plurality of communication devices, including a first device 110, a second device 120 and a third device 130 can communicate with each other.

In the example of FIG. 1, the first device 110 is illustrated as a terminal device while the second device 120 and the third device 130 are illustrated as network devices which can serve terminal devices. The serving area of the second device 120 may be called a cell 102. Meanwhile, the second device 120 may service multiple cells. As shown in FIG. 1, the second device 120 further serves a cell 103. The serving area of the third device 130 may be called a cell 104.

The first device 110, which is currently served in the cell 103, may move out of the coverage of the cell 103 and move to the cell 102. In this scenario, the first device 110 will perform cell reselection and it is served by the same network device, i.e., the second device 120, before and after the cell reselection. In other cases, the first device 110 served by the second device 120 may move out of the coverage of the cell 102 and move to the cell 104 of the third device 130. In such scenario, the first device 110 may perform cell reselection and it will be served by the third device 130 after cell reselection or a handover procedure.

It is to be understood that the number of devices and their connections shown in FIG. 1 are only for the purpose of illustration without suggesting any limitation. The example communication network 100 may include any suitable number of devices adapted for implementing embodiments of the present disclosure. Although not shown, it would be appreciated that one or more additional devices may be located in the cell 102, cell 103 and cell 104, and one or more additional cells may be deployed in the example communication network 100. It is noted that although illustrated as network devices, the second device 120 and the third device 130 may correspond to a device other than a network device. Although illustrated as a terminal device, the first device 110 may correspond to a device other than a terminal device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the example communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: code division multiple access (CDMA), frequency division multiple access (FDMA), time division multiple access (TDMA), frequency division duplex (FDD), time division duplex (TDD), multiple-input multiple-output (MIMO), orthogonal frequency division multiple (OFDM), discrete Fourier transform spread OFDM (DFT-s-OFDM) and/or any other technologies currently known or to be developed in the future.

3GPP working groups have introduced a feature called an inactive state. A device (e.g., a terminal device) can transition between an inactive state, a connected state, and an idle state. The inactive state may sometimes be referred to as an inactive mode, a RRC_INACTIVE state, an inactive state in a RRC_CONNECTED mode and such terms are used interchangeably herein. The connected state may sometimes be referred to as a connected mode, a RRC_CONNECTED state, and such terms are used interchangeably herein. The idle state may sometimes be referred to as an idle mode, a RRC_IDLE state, and such terms are used interchangeably herein.

In the inactive state, the terminal device may not have any dedicated resources (e.g., time and frequency resources) for transmission and/or reception. In the connected state, a connection is established between the terminal device and the network device and thus the terminal device can perform normal communications with the network device via the connection. In the idle state, there is no connection established between the terminal device and the network device. The idle state can be used for example during terminal device power-on. Once a setup procedure is done, the terminal device can transit to connected state and is ready for data transmission.

As mentioned above, there is a certain amount of signaling overhead and power consumption to transition the terminal device from an inactive state to a connected state by establishing or reestablishing a connection with the network device. If connection setup and subsequent release happens for each data transmission of the terminal device in the inactive state, no matter how small and infrequent the data packets are, it may result in unnecessary power consumption and signalling overhead. Thus, allowing data transmission to and/or from a terminal device that is in inactive state makes sense if the terminal device has intermittent small data packets to transmit. It has been agreed to support small data transmission (SDT) for a terminal device in inactive state, without requiring the terminal device to establish a connection with the network device. As used herein, the term "SDT" refers to a type of transmission where a small amount of data is triggered, although other terms may also be used.

There are various applications that involve exchange of relatively small amounts of data. For example, in some applications of mobile devices, SDT may include traffic from Instant Messaging (IM) services, heart-beat or keep-alive traffic from IM or email clients and other services, push notifications in various applications, traffic from wearables (including, for example, periodic positioning information), and/or the like. In some applications of non-mobile devices, SDT may include sensor data (e.g., temperature, pressure readings transmitted periodically or in an event-triggered manner in an IoT network), metering and alerting information sent from smart meters, and/or the like.

Signalling overhead from terminal devices in the inactive state for small data packets is a general problem, not only for network performance and efficiency but also for the UE battery performance. In general, any device that has intermittent small data packets in the in active state will benefit from enabling SDT. In some example embodiments, SDT may be enabled using messages sent in random access channel (RACH) procedures, and/or configured grants.

In addition, as mentioned above, it has been agreed in 3GPP that a terminal device in the inactive state can send and/or receive multiple uplink and/or downlink packets during a SDT procedure without transitioning into the connected state in between or performing separate SDT procedures for the transmissions of the packets.

However, the inventors of the present application noticed that, according to legacy radio resource control (RRC) resume procedure, the terminal device will go to an idle state when cell reselection happens during the procedure (i.e., when a timer (e.g., T319) for the procedure starts running upon transmission of RRC resume request). Accordingly, there is no existing solution for handling cell reselection in such a scenario. Furthermore, with the agreement of successive uplink or downlink transmission without transitioning to the connected state, it is not a rare case anymore for cell reselection to occur during a SDT procedure. It is not desired to go to idle state when the UE is performing SDT transmission in inactive state, because this will lead to the loss of already transmitted data. Thus, solutions of mobility for a SDT procedure are needed.

Cell Reselection During SDT Procedure

As mentioned above, the inventors of the present application noticed that, according to legacy radio resource control (RRC) resume procedure, the first device 110 transitions to an idle state when cell reselection happens during the procedure (i.e., when a timer (e.g., T319) for the procedure starts running upon transmission of RRC resume request and has not expired). In addition, if the first device 110, which is in an inactive state, goes to an idle state, the first device 110 may have to perform a RRC setup procedure with the second device 120, so as to transition to the connected state. In this case, the second device 120 (e.g., a gNB) will not continue maintaining the context information of the first device 110 in the idle state. As such, if the first device 110 moves from an old cell to a new cell, the third device 130 for the new cell can neither fetch UE context information nor the already transmitted data from the second device 120 for the old cell. Consequently, packets that have been transmitted during a SDT procedure to the old cell will be lost. Meanwhile, there will also be more latency as the connection needs to be established again. Therefore, due to the above-mentioned reasons, it is not desirable to put a first device 110 into the idle state during the SDT procedure in the inactive state.

Furthermore, with the agreement of successive uplink or downlink transmission without transitioning to the connected state, it is not a rare case anymore for cell reselection to occur during the SDT procedure. Moreover, as mentioned, it is not desired to go to the idle state when the first device 110 is performing SDT transmission in the inactive state due to the loss of already transmitted data as well as notable latency. Therefore, a solution is needed for cell reselection during the SDT procedure for a first device 110 in the inactive state.

According to some example embodiments of the present disclosure, there is provided a solution for mobility for a SDT procedure. In this solution, the first device, which is in an inactive state and served in a first cell of the second device, performs a session of small data transmission between the first device and the second device. The first device determines whether a potential cell reselection criterion is satisfied when the session of small data transmission is ongoing. If a potential cell reselection criterion is satisfied, the first device transmits, to the second device, first information indicating an intention of cell reselection. As such, if the cell reselection happens during SDT procedure, the second device is able to put the first device into either the inactive state or the connected state, such that the second device will keep both the data already transmitted in the SDT procedure and context information of the first device so that when reselecting to a new cell, the above context information and data can be forwarded to a third device for a new cell. Accordingly, already transmitted data is not lost in case cell reselection happens before the session of small data transmission is completed. It is also possible to avoid the error case where the first device falls back into the idle state.

Figure 2:
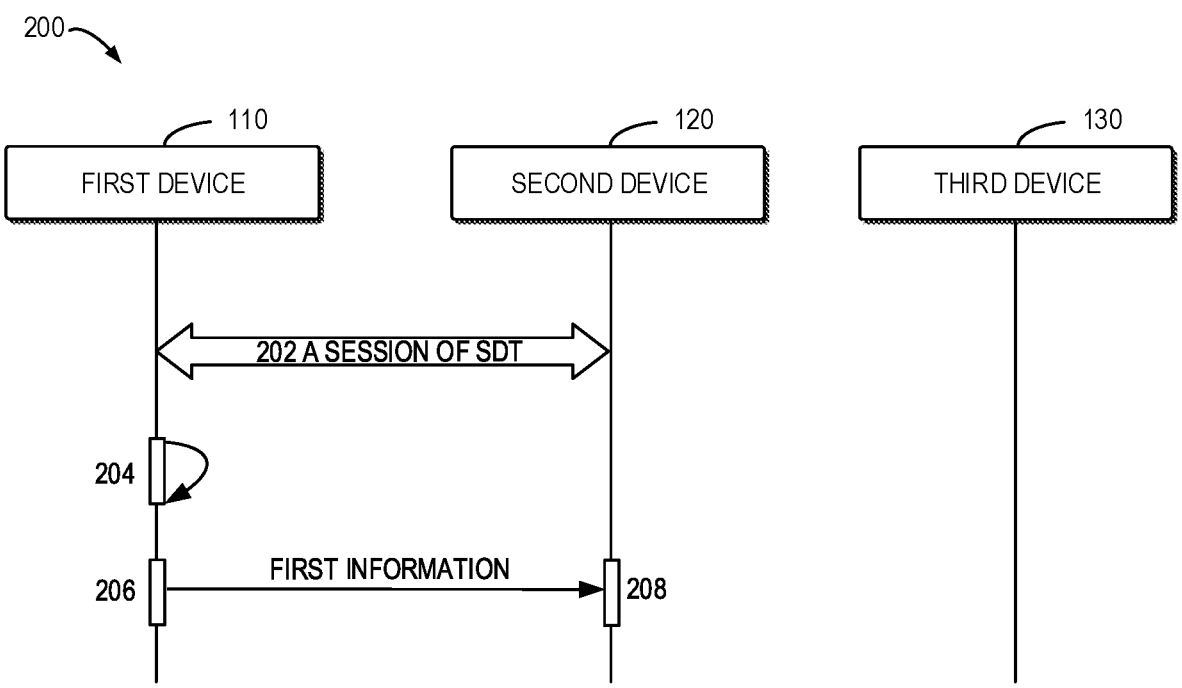
FIG. 2 illustrates a signaling flow for cell reselection during a SDT procedure in accordance with some example embodiments of the present disclosure.

Reference is now made to FIG. 2, which shows a signaling flow 200 for cell reselection during a SDT procedure in accordance with an embodiment of the present disclosure. For the purpose of discussion, the signaling flow 200 will be described with reference to FIG. 1. The signaling flow 200 may involve the first device 110, the second device 120, and the third device 130 as illustrated in FIG. 1.

In the signalling flow 200, the first device 110 in an inactive state is located and served in a cell (e.g., a cell 103) of the second device 120. The cell in which the first device 110 is currently served is sometimes referred to as a first cell for ease of discussion. The first device 110, which is in the inactive state, performs 202 a session of SDT with the second device 120. In some examples, the first device 110 may transmit uplink small data to the second device 120. In some other examples, the first device 110 may receive downlink small data from the second device 120.

The first device 110 determines 204 whether a potential cell reselection criterion is satisfied when the session of SDT is ongoing. In some example embodiments, if the first device 110 moves to the border of the cell 103 or moves out of the coverage of the cell 103 during the SDT procedure, the first device 110 may determine that a potential cell reselection criterion is satisfied.

In some example embodiments, the potential cell reselection criterion may be related to the reference signal received power (RSRP) at the first device 110 and/or signal-to-interference-plus-noise ratio (SINR) at the first device 110 and or reference signal received quality (RSRQ) at the first device 110. For example, if the first device 110 moves during the SDT procedure and RSRP at the first device 110 becomes below a predetermined threshold, it is determined that the potential cell reselection criterion is satisfied. Alternatively, or in addition, if the SINR at the first device 110 is below a certain threshold, it is determined that the potential cell reselection criterion is satisfied. Alternatively, or in addition, if the RSRQ at the first device 110 is below a certain threshold, it is determined that the potential cell reselection criterion is satisfied. It should be appreciated that the potential cell reselection criterion may be in any form and is not limited to the examples mentioned above. The scope of the present disclosure is not limited in this regard.

Upon satisfaction of potential cell reselection criterion when the section of SDT is ongoing (e.g., when the T319 or other timer for the SDT procedure is running), the first device 110 transmits 206, to the second device 120, information indicating an intention of cell reselection (referred to as "first information" for ease of discussion). That is, the first device 110 notifies the second device 120 that cell reselection is about to happen. As such, by receiving 208 the first information from the first device 110, the second device 120 may put the first device 110 to remain in the inactive state or transition to the connected state, which may avoid the first device 110 being put into the idle state. In this way, the context information of the first device 110 may not be deleted from the second device 120 and thus may be utilized if the cell reselection for the first device 110 actually occurs.

In some example embodiments, an offset or a separate threshold may be defined for the potential cell reselection criterion that would trigger the above reporting of the first information before a criterion for actual cell reselection is satisfied. As such, the second device 120 is notified about the occurrence of cell reselection in advance, that is, before the actual cell reselection. With the advance notice of the intention of cell reselection, the second device 120 may have more time to react and, for example, put the first device 110 into the inactive or connected state if cell reselection is about to happen. As such, it is possible to avoid the error case where the first device 110 falls back to the idle state.

In some example embodiments, the potential cell reselection criterion may also be determined by the first device 110 based on an existing criterion that is configured for actually triggering cell reselection. In some other examples, the potential cell reselection criterion may also be configured separately.

In some example embodiments, the first information may comprise an identity of a cell (e.g., the cell 102 or 104) to be re-selected by the first device 110. The cell to be re-selected is sometimes referred to as a second cell for ease of discussion. In some example embodiments, the first information may be transmitted via a medium access control control element (MAC-CE) or a RRC message. In some example embodiments, the first information may comprise an explicit indication that the potential cell reselection criterion is satisfied. Alternatively, or in addition, the first information may comprise an indication of whether the inactive state or the connected state is preferred by the first device 110.

In some example embodiments, the first information (for example, the RRC message) may be in the form of a radio resource management (RRM) measurement result (e.g., a measurement report). In some example embodiments, the RRC message may comprise UE assistance information. That is, for example, the satisfaction of the potential cell reselection criterion serves as a trigger for a UE assistance information procedure in which the first device 110 may send a RRC state preference (e.g., an inactive state or connected state) to the second device 120. By receiving such RRC state preference, the second device 120 may determine from the state preference that the cell reselection of the first device 110 is about to happen.

In some example embodiments, the first device 110 may perform cell reselection to the third device 130. In some other example embodiments, a handover procedure may be performed such that the first device 110 will hand over to the third device 130. Detailed procedures thereof will be described in connection with FIG. 3 and FIG. 4 in the following, respectively.

Figure 3:
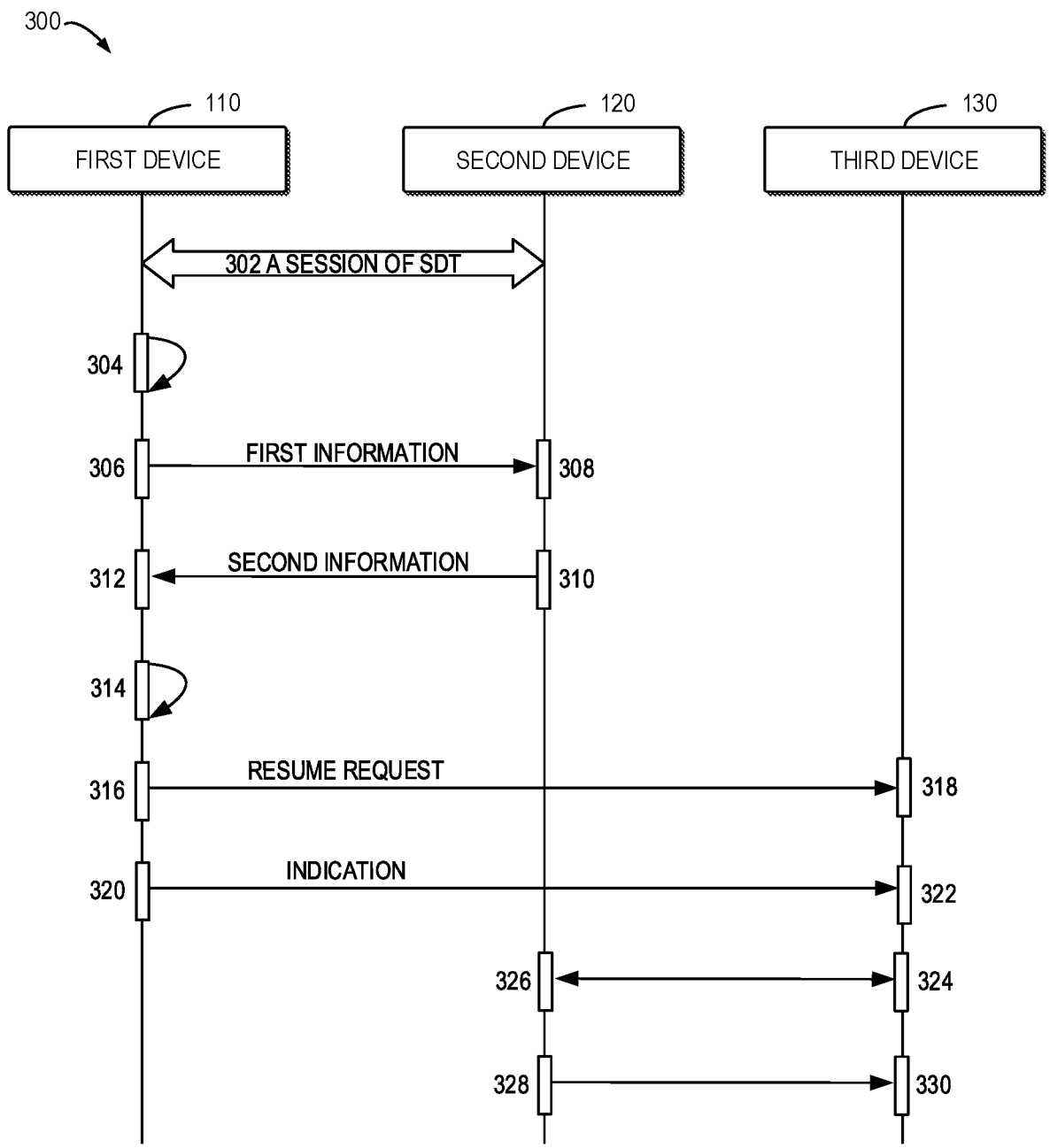
FIG. 3 illustrates a signaling flow for cell reselection during a SDT procedure in accordance with some other example embodiments of the present disclosure.

FIG. 3 illustrates a signaling flow 300 for cell reselection during a SDT procedure in accordance with some embodiments of the present disclosure. For the purpose of discussion, the signaling flow 300 will be described with reference to FIG. 1. The signaling flow 300 may involve the first device 110, the second device 120, and the third device 130 as illustrated in FIG. 1.

The actions at 302, 304, 306, 308 in the signaling flow 300 are similar to those at 202, 204, 206, 208 in FIG. 2, thus the details thereof will be incorporated herein.

As shown in FIG. 3, the second device 120 receives 308, from the first device 110, the first information indicating the intention of cell reselection. Then, the second device 120 may put the first device 110 into inactive state or connected state. In such a case, cell reselection may occur as usual in inactive state.

In the example embodiments of FIG. 3, the second device 120 transmits 310, to the first device 110, information for switching the first device 110 from the first cell (e.g., cell 103) to a second cell of a third device. For ease of discussion, such information is referred to as second information.

As an embodiment of transmitting the second information, the second device 120 may transmit 310, to the first device 110, first control information to instruct the first device 110 to maintain the inactive state. According to such first control information, the first device 110 may switch from the first cell to the second cell while the first device 110 remains in the inactive state.

Specifically, in some example embodiments, upon receiving the first information indicating the intention of cell reselection, the RRC connection between the second device 120 and the first device 110 in the inactive state is released, such that the first device 110 may continue the session of SDT in a new cell (i.e., the second cell). In such embodiments, the second device 120 transmits a RRC message (e.g., a RRC Release message) with "suspendConfig" to the first device 110. In some examples, the second device 120 may update the first device 110 with new security configuration by including the security configuration to be used in communication with the second cell in the RRC Release message. The security configuration may, for example, comprise inactive-radio network temporary identity (I-RNTI), NextHopChainingCount (NCC), and/or any other information that is required in communication with a new cell. As such, the security configuration may then be used by the first device 110 when accessing the second cell.

In some example embodiments, upon receiving 312 the second information, for example, upon receiving the first control information which includes "suspendConfig" in a RRC Release message at the first device 110, the first device 110 may suspend the connection (e.g., the RRC connection) over which the session of SDT is transmitted and reselect 314 the second cell.

In some example embodiments, upon receiving the second information, the first device 110 reselects 314 a new cell (referred to as the second cell) to perform cell reselection while the first device 110 remains in the inactive state. In one example, the first device 110 performs cell reselection from the first cell (e.g., the cell 103) of the second device 120 to the second cell. In an example, the second cell may be the cell 103 of the third device 130. In such an example, the cell reselection involves the first device 110, the second device 120, and the third device 130, as illustrated in FIG. 3. In other examples, the second cell may be the cell 102 of the same second device 120 and thus the entities involved in the cell reselection may comprise the first device 110 and the second device 120. For the purpose of illustration only, the third device 130 is involved in the signaling flow 130, but it would be appreciated that the same actions may be performed at the second device 120 if the second cell is selected as the cell 102.

After that, in some example embodiments, the first device 110 transmits 316, to the third device 130, a resume request for resuming or reinitiating the session of SDT in the second cell. The resume request may be transmitted via the common control channel (CCCH). In such cases, in response to the third device 130 receiving 318 the resume request, context fetch and data forwarding may be performed between the first cell and the second cell.

Additionally or alternatively, in some example embodiments, upon a new cell reselection, the first device 110 also transmits 320, to the third device 130, an indication that the session of the SDT was ongoing in the first cell. In an example, the indication may be transmitted by the first device 110 via a MAC-CE message. In another example, the indication may be transmitted by the first device 110 a RRC message.

After receiving 322 the indication, the third device 130 could know that there was an ongoing SDT procedure between the first device 110 and the second device 120. If it is determined that the first device 110 switches from the first cell to the second cell of the third device 130, the third device 130 receives, from the second device 120, data of the session of the small data transmission. The data may include such data already transmitted to the second device 120 while the first device 110 was served in the first cell. In some example embodiments, the third device 130 may not process the data received from the first device 110 once receiving it, and it will wait until receiving the already transmitted data forwarded from the first device 110 such that the already transmitted data may be combined and processed together with the data received directly from the first device 110. As a result, mobility is supported for SDT procedure in inactive state with less packet loss.

In particular, in some examples, the third device 130 requests 324 to fetch context information of the first device 110 from the second device 120 using the identity of the first device 110. Since the second device 120 sets the first device 110 into the connected state or inactive state, it can still maintain the context information of the first device 110. Thus, the second device 120 transmits 326 the context information of the first device 110 to the third device 130. As such, the connection between the first device 110 and the third device 130 does not need to be established again from scratch, thereby reducing latency for the cell reselection procedure.

Moreover, in some example embodiments, the second device 120 may also forward 328 the already transmitted data to the third device 130. In some examples, the already transmitted data may be uplink data that the first device 110 has transmitted to the second device 120 during the SDT procedure. In some other examples, the already transmitted data may also be downlink data that was transmitted from the core network to the second device 120. The scope of the present application is not limited in this regard. As a result, the already transmitted packets will not be lost.

In some example embodiments, after receiving 330 the data forwarded from the second device 120, the third device 130 may combine this data with those received directly from the first device 110 in the session of SDT.

In some example embodiments, the first device 110 may also perform a RRC re-establishment procedure by transmitting, to the third device 130, a re-establishment request for reinitiating the session of SDT in the second cell. In some examples, the re-establishment procedure may be limited to the case where the first device 110 (e.g., a UE) was allocated a cell-radio network temporary identifier (C-RNTI) already in the previous cell during the SDT procedure (which the first device 110 then uses for the re-establishment). The first device 110 may include the C-RNTI in the RRC re-establishment request message to the second cell. In some examples, based on the re-establishment request from the first device 110, the third device 130 may determine the previous cell the first device 110 was performing SDT procedure, for instance, by means of the first device 110 indicating a physical cell identity (PCI) as part of the re-establishment message, and may determine the cell and/or the network device (e.g., the second network device 120) from which to request for UE context and/or already transmitted SDT data. In some examples, fresh I-RNTI and NCC may be signaled already on the source cell for the UE to perform re-establishment.

Figure 4:
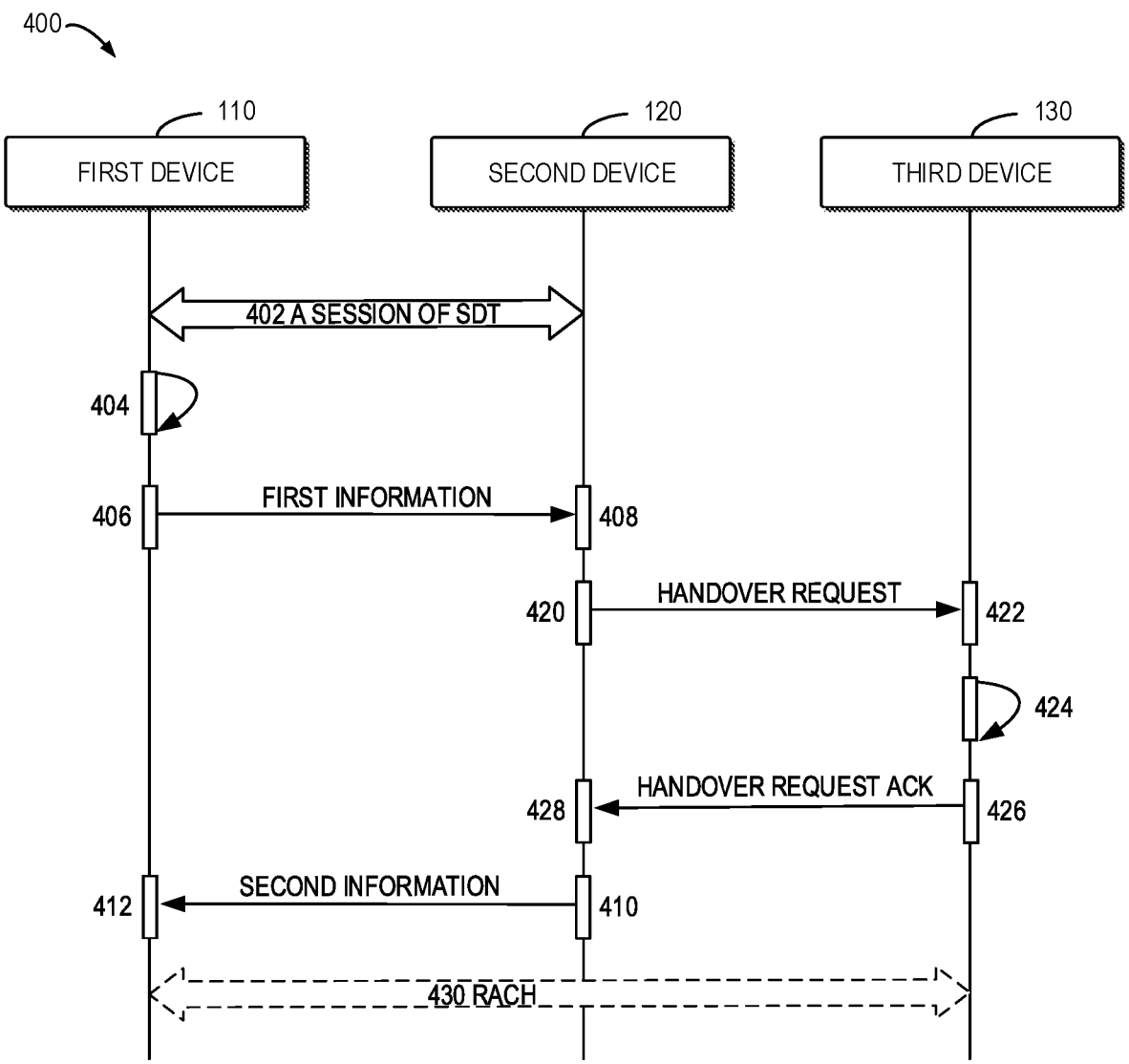
FIG. 4 illustrates a signaling flow for cell reselection during a SDT procedure in accordance with some further example embodiments of the present disclosure.

FIG. 4 illustrates a signaling flow for cell reselection during a SDT procedure in accordance with some further example embodiments of the present disclosure. For the purpose of discussion, the signaling flow 400 will be described with reference to FIG. 1. The signaling flow 400 may involve the first device 110, the second device 120, and the third device 130 as illustrated in FIG. 1.

The steps of 402, 404, 406, 408 shown in FIG. 4 are similar to that of 202, 204 and 206, 208 shown in FIG. 2, thus the details thereof will be incorporated herein. As mentioned above, the first device 110 transmits 406, to the second device 120, the first information. In some example embodiments in FIG. 4, after receiving the first information from the first device 110, the second device 120 transmits 410 second information which includes second control information to instruct the first device 110 to transition from the current inactive state to a connected state. In an example, the second device 120 may transmit 410 a RRC resume message so as to set the first device 110 to the connected state. In some examples, after receiving 412 the RRC resume message, the first device 110 may perform a state transition from the inactive state to the connected state. In such examples, a conventional handover procedure may be performed such that the first device 110 may handover from the first cell to the second cell. In such examples, a handover command may be sent after the RRC resume is completed or in conjunction in the same MAC PDU with the RRC resume.

Additionally or alternatively, as mentioned above, in some example embodiments, the first information may comprise an identity of the second cell (e.g., cell 104) to be re-selected by the first device 110. In such example embodiments, upon receiving the first information, the second device 120 may perform a handover preparation procedure with the third device 130 by transmitting 420 a handover request message to the third device 130. Upon receiving 422 the handover request message, the third device 130 performs 424 an admission control. In an example embodiment, the third device 130 may admit the handover requests with priority. For example, the first device 110 in the inactive state may be allocated with a relatively lower priority (compared with other terminal devices in the connected state) for admission. In an example embodiment, the third device 130 may admit the handover request for the first device 110 in inactive state by considering the priority and the current available resources.

In some example embodiments, after performing the admission control, the third device 130 transmits 426 a handover request acknowledgement to the second device 120. After receiving 428 the handover request acknowledgement, the second device 120 transmits 410 a RRC resume message to the first device 110 with a handover command. The handover command indicates an identity of the second cell for the handover, so as to handover the first device 110 to the cell it intended to re-select to. In particular, upon receiving 412 the RRC Resume message with handover (HO) command, the first device 110 performs 430 RACH to the second cell and continues data transmission in connected state.

In the above, some example embodiments for solutions of cell reselection during SDT procedure are introduced. In such example embodiments, the second device 120 is involved during the cell reselection procedure. In the following, a different solution will be introduced. In this solution, the second device 120 does not need to be involved during the cell reselection procedure but only when the session of SDT is performed between the first device 110 and the second device 120.

Figure 5:
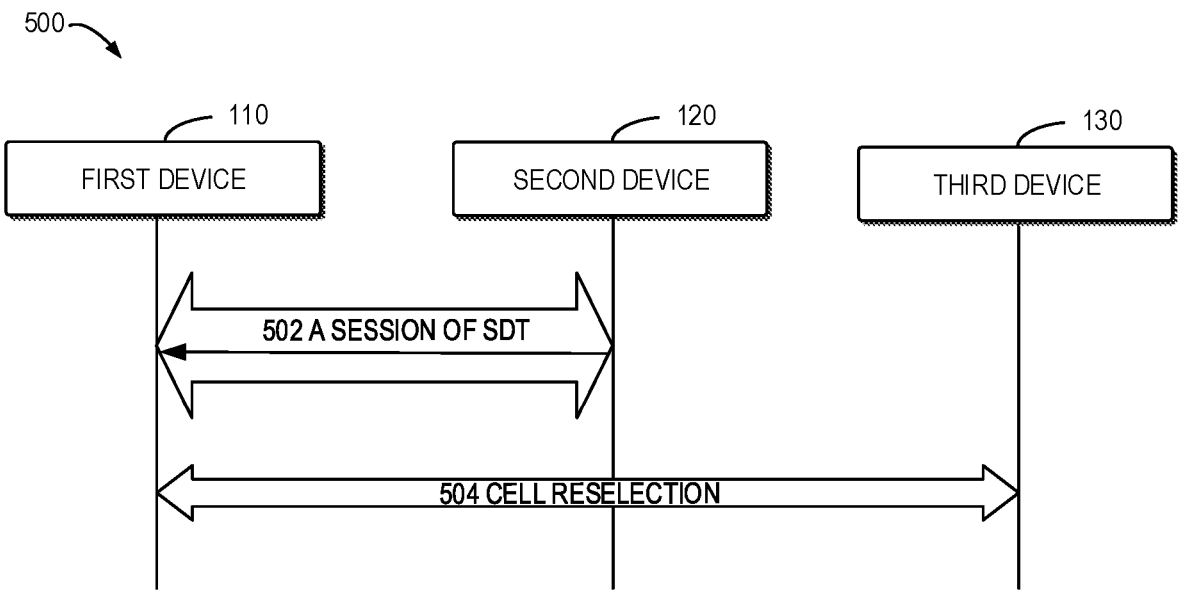
FIG. 5 illustrates a signaling flow for cell reselection during a SDT procedure in accordance with some further example embodiments of the present disclosure.

FIG. 5 illustrates a signaling flow 500 for cell reselection during a SDT procedure in accordance with some embodiments of the present disclosure. For the purpose of discussion, the signaling flow 500 will be described with reference to FIG. 1. The signaling flow 300 may involve the first device 110, the second device 120, and the third device 130 as illustrated in FIG. 1.

As shown in FIG. 5, a session of SDT is performed 502 between the first device 110 and the second device 120. During the session of SDT, the second device 120 may transmit a security configuration to the first device 110 in response to a SDT transmission by the first device 110 (for example, the first SDT transmission). In some examples, the security configuration may include fresh I-RNTI and NCC. As such, with the security configuration, the first device 110 may perform 504 cell reselection by itself whenever needed (e.g., when the potential cell reselection criterion is satisfied) in advance, without going into an idle state.

The foregoing describes some embodiments in which the first device 110 performs cell reselection according to the information provided by the second device 120 when the SDT is ongoing. In some embodiments, when SDT is on-going, if cell reselection is to be performed, 110 may also determine whether mobility is allowed.

In some example embodiments, the first device 110 may further determine whether mobility during a SDT procedure is allowed. The mobility during small data transmission procedure represents a switch of the first device 110 from the first cell while the session of the small data transmission is ongoing.

In some example embodiments, the first device 110 may receive, from the second device 120, configuration information associated with the mobility during the SDT procedure.

In some example embodiments, the configuration information may include an indication of whether the mobility during the SDT procedure is allowed for the first device 110, an indication of whether the mobility during the SDT is supported by the second device 120, at least one cell in which the mobility during the SDT procedure is allowed, at least one device by which the mobility during the SDT procedure is allowed, and an area in which the mobility during the SDT procedure is supported, or an indication of whether the SDT procedure is restricted to the first cell.

The first device 110 may determine whether the mobility during the SDT procedure is allowed based on one or more of the above-mentioned configuration information. Then, if it is determined that the mobility during the SDT procedure is allowed, the first device 110 may transmit the first information indicating the intention of cell reselection.

In some example embodiments, the first device 110 may receive, from the second device 120, an indication of whether a SDT is restricted to the first cell. If it is determined that the indication indicates that the SDT is not restricted to the first cell, the first device 110 may perform the SDT in the second cell after switching to the second cell.

In some embodiments, a timer (e.g. T319) which dictates how long the SDT procedure is ongoing (e.g., when the T319 or other timer for the SDT procedure is running) is extended and/or adapted to support longer SDT sessions. In some examples, new start and/or restart and/or stop conditions may be defined for the timer (e.g., T319) which could include one or more of the following: after each new UL transmission (which may or may not mean re-transmissions are not accounted) after first transmission for SDT is performed; or after the MAC level contention resolution has been received (e.g., Random Access procedure is successfully completed and/or contention resolution is considered successful); or DL transmission is received after first SDT transmission; or the second device 120 indicates stop/(re) start explicitly e.g., via physical layer, MAC layer or RRC layer signalling; or MAC level contention resolution (MSG4) as above is received without RRC message; or when UL and/or DL SDT is completed; or based on the PDCCH indicating a new transmission (DL or UL) for the first device 110. In some examples, the first SDT transmission may be MSGA of the 2-step Random Access procedure, or Msg3 of the 4-step Random Access procedure, or first transmission on configured grant resources configured for SDT. In some examples, the timer is started with scaled (e.g., timer value is multiplied or increased) value in case RRC-ConnectionResumeRequest (or any other RRC message defined for the purpose) is transmitted for SDT or in case SDT procedure is triggered. The scaling factor may be indicated to the first device 110 in a dedicated manner (e.g., upon sending the first device 110 to an inactive state by the second device 120) or by the system information broadcast.

UAC Handling for SDT Procedure

In order to support access barring check for cell reselection during a SDT procedure, another idea of the present application is to perform the access control before accessing a new cell.

Specifically, the inventors of the present application noticed that, in conventional solutions, UAC is checked only at the beginning of the access procedure. As such, if a RAN2 (radio layer 2 and radio layer 3 RR) solution, which may define solutions to potentially recover the lost data, is provided, then the current UAC procedure does not work because UAC is checked only when the data transmission is triggered, but not during the data transfer. Thus, if cell reselection is triggered during a SDT procedure, UAC is not checked on the new cell. Then, the problem is that, in some cases, access for the terminal device may need to be barred, but the terminal device will not check that according to current UAC procedure. Therefore, a UAC handling procedure is needed for cell reselection during SDT procedure.

It should be understood that cell reselection during SDT procedure means cell reselection occurs before SDT transmission is completed. SDT transmission completion refers for instance to completion of UL and/or DL (subsequent) data transmission. In one example, SDT transmission may be considered to be complete after explicit signaling from a network device to a terminal device. It should also be understood that SDT may be enabled using messages sent in random access channel (RACH) procedures, and/or configured grants.

Figure 6:
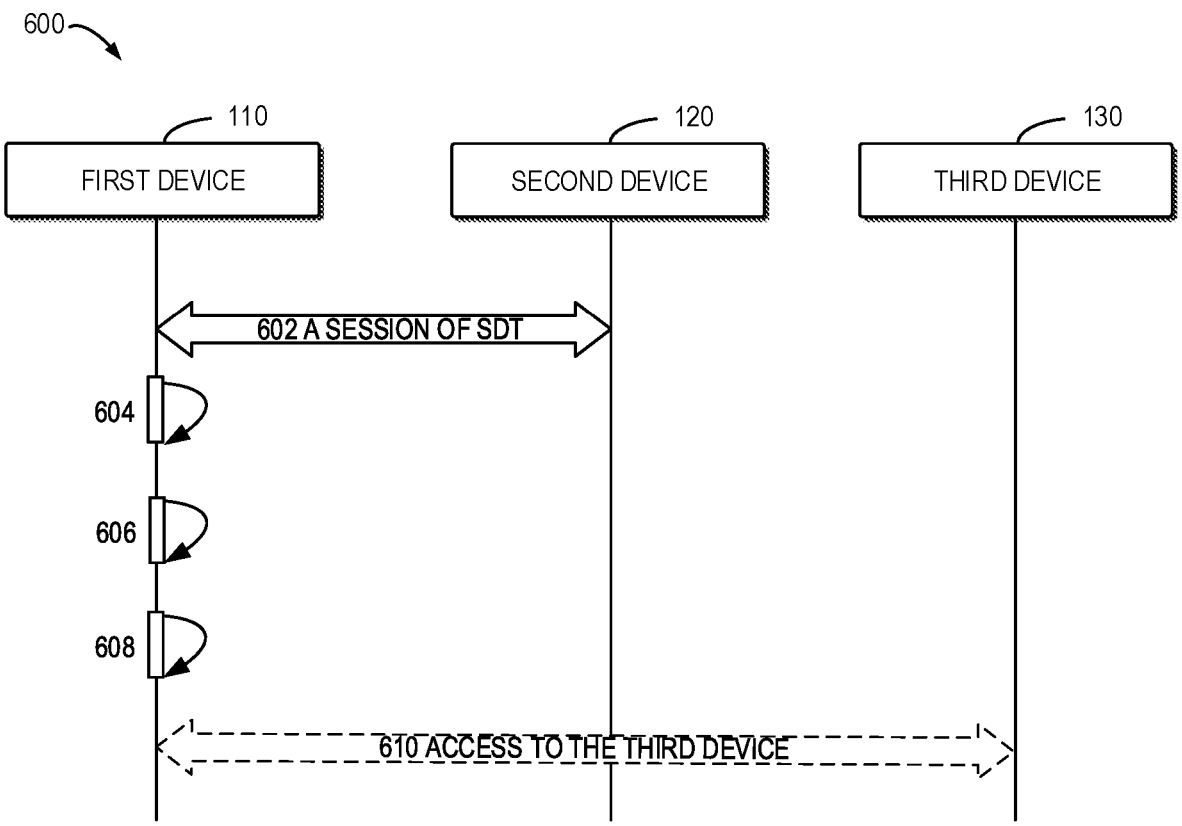
FIG. 6 illustrates a signaling flow for unified access control (UAC) handling in cell reselection during a SDT procedure in accordance with some example embodiments of the present disclosure.

FIG. 6 illustrates a signaling flow for UAC handling in cell reselection during a SDT procedure in accordance with some example embodiments of the present disclosure. For the purpose of discussion, the signaling flow 600 will be described with reference to FIG. 1. The signaling flow 600 may involve the first device 110, the second device 120, and the third device 130 as illustrated in FIG. 1.

In the signaling flow 600, the first device 110 in an inactive state is located and served in a cell (e.g., a cell 103) of the network 120. The cell in which the first device 110 is currently served is sometimes referred to as a first cell for ease of discussion. The first device 110, which is in the inactive state, performs 602 a session of SDT with the second device 120. In some examples, the first device 110 may transmit uplink small data to the second device 120. In some other examples, the first device 110 may receive downlink small data from the second device 120.

The first device 110 determines 604 whether a target cell reselection criterion is satisfied, which may be caused by the mobility of the first device 110. Then, if it is determined that a target cell reselection criterion is satisfied (e.g., due to the mobility of the first device 110), the first device 110 reselects 606 a new cell (referred to as a second cell) to move to. The first device 110 performs 608 access control before accessing the second cell. As such, access control (e.g., UAC) is able to be performed after the first device selects a new cell when a SDT session is on-going. Meanwhile, better network control for UE access via UAC procedure can be ensured when the access control is performed according to the information obtained from the network device 130. After performing access barring check, the first device may access 610 (e.g., may perform a RACH procedure with) the third device 130 if allowed.

Details on how the access control is performed at the first device 110 will be described with various embodiments in the following. There may be various ways to perform the access control at the first device 110. In some example embodiments, the first device 110 may first obtain information on the access control. In some example embodiments, the first device 110 may obtain SIB 1 from the third device 130. In some examples, SIB1 may include UAC barring per public land mobile network (PLMN) list, UAC barring for common, and/or the like. In some other examples, the access stratum (AS) of the first device 110 may obtain access category information from the non-access stratum (NAS) of the first device 110. NAS refers for instance to upper layers and AS refers for instance to RRC.

For example, access categories may comprise access categories 0, 1, 2, which respectively indicate whether it is an access attempt for mobile terminating (MT) access, an emergency session, data, or signaling. In another example, the access category may represent an access priority. It should be appreciated that the access category can be defined in other similar ways and is not limited to the examples given above, that is, the scope of the present application is not limited in this regard.

In some example embodiments, the AS of the first device 110 may include information relating to cell reselection to the NAS of the first device 110. Based on this indication, the NAS may then request a new access barring check from the AS on the re-selected cell. In such example embodiments, the NAS may provide the AS the access category for the first device 110, based upon which the AS may perform access control. As such, the first device 110 may determine whether its access category is admitted according to the SIB1 obtained from the third network device 130. In some examples, if the current SDT is a data transmission with low priority, the first device 110's access to the new cell may be barred. In another example, if the access category represents that it is an emergency call, the first device 110's access to the new cell may be allowed.

Alternatively, in some other example embodiments, the AS of the first device 110 may inform the NAS of the first device 110 that access barring (AB) re-check is needed. As such, the NAS may then request a new access barring check from the AS on the re-selected cell and also provide with the access category.

Additionally or alternatively, the AS of the first device 110 may inform the NAS of the first device 110 whether re-attempt for the access category is allowed or barred. In some examples, once the access category is allowed, the first device 110 is able to access to the new cell of third device 130, for example, via a conventional procedure such as RACH procedure. Otherwise, if the access category is not allowed, the first device 110 will be barred and cannot access to the new cell, such that the on-going SDT transmission is not to be continued in the new cell.

In one example, the AS of the first device 110 may check the barring status based on the original request. The original request may correspond to the request for the SDT transmission in the old cell before cell reselection. As such, the AS may not need to obtain the information on access category from the NAS. Instead, the AS may check whether the access is allowed with the assumption that the access category is not changed since the original request for the SDT transmission was initiated. In addition, the first device 110 may inform the NAS of the first device 110 that SDT failed in case access is barred in the new cell.

Alternatively, in one example, the AS of the first device 110 may check the barring status without involving the NAS and reinitiate SDT transmission when the access is allowed.

In some example embodiments, the third device 130 (i.e., the device for the new cell) may transmit an indication on whether access control is performed to the first device 110. Then, the first device 110 may determine whether to perform access control based on the indication from the third device 130. In some examples, the third device 130 may transmit the indication to the first device 110 via broadcasting or dedicated signaling.

In some example embodiments, access control may be ignored on the re-selected cell and access re-establishment may be performed regardless of the access category. For example, the first device 110 may be configured to ignore the access control (e.g., UAC) procedure and access the new cell after the new cell is re-selected by the first device 110.

Alternatively, the NAS or the AS may re-start the SDT transmission. In one example, upon checking access control and once the access category is allowed, the NAS or the AS may re-start the SDT transmission.

Accordingly, by enabling an access control procedure during an on-going SDT procedure, better network control for the first device 110 can be ensured. Only when allowed, the first device 110 is able to access the third device 130, otherwise, the first device 110 will be barred, for example, based on the SIB1 information obtained from the third device 130, such that the data transmission will not be continued in the new cell.

Example Methods

Figure 7:
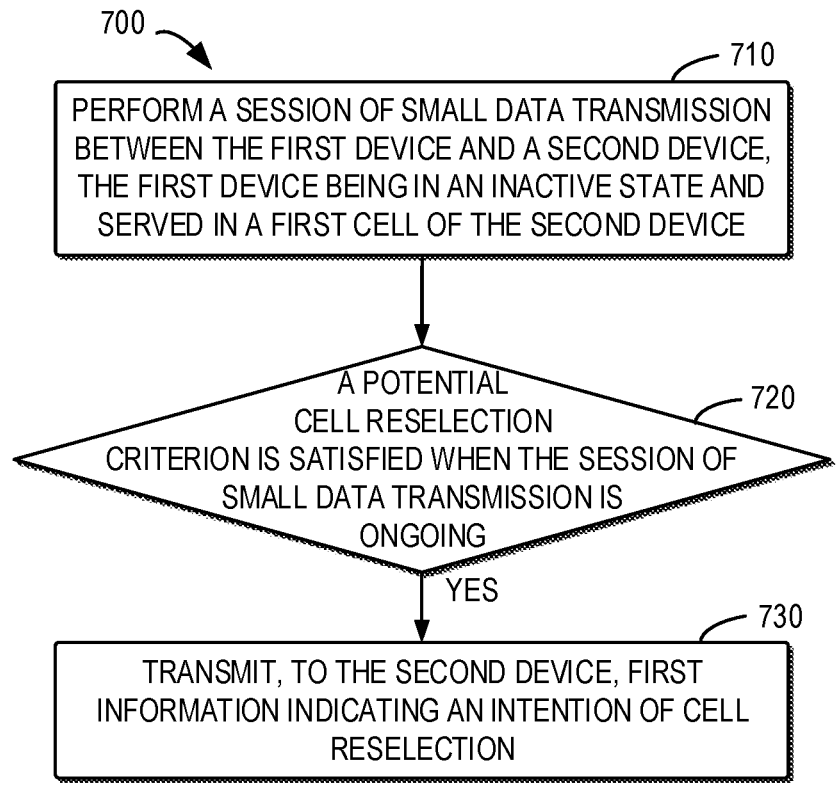
FIG. 7 illustrates a flowchart of a method implemented at a first device in accordance with some example embodiments of the present disclosure.

FIG. 7 illustrates a flowchart of a method 700 implemented at a first device in accordance with some embodiments of the present disclosure. For the purpose of discussion, the method 700 will be described from the perspective of the first device 110 with reference to FIG. 1.

At block 710, the first device performs a session of small data transmission between the first device and a second device. The first device is in an inactive state and served in a first cell of the second device. At block 720, the first device determines whether a potential cell reselection criterion is satisfied when the session of small data transmission is ongoing. At block 730, in accordance with a determination that a potential cell reselection criterion is satisfied, transmit, to the second device, first information indicating an intention of cell reselection.

In some example embodiments, the first information comprises at least one of: an identity of a second cell to be re-selected by the first device, an indication that the potential cell reselection criterion is satisfied, and an indication of whether the inactive state or a connected state is preferred by the first device.

In some example embodiments, the method 700 further comprises receiving, from the second device, second information for switching from the first cell to a second cell of a third device; and switching from the first cell to the second cell based on the second information.

In some example embodiments, the receiving the second information comprises receiving, from the second device, first control information to instruct the first device to maintain the inactive state, and switching from the first cell to the second cell comprises performing cell reselection from the first cell to the second cell while the first device remains in the inactive state.

In some example embodiments, receiving the second information comprises receiving, from the second device, a security configuration to be used in communication with the second cell.

In some example embodiments, receiving the second information comprises receiving, from the second device, a suspending configuration to suspend a connection over which the session of the small data transmission is transmitted, and the method 700 further comprises: transmitting, to the third device, a resume request for resuming the session of the small data transmission in the second cell.

In some example embodiments, receiving the second information comprises receiving second control information to instruct the first device to transition from the inactive state to a connected state, and switching from the first cell to the second cell comprises performing a state transition from the inactive state to the connected state, and performing a handover from the first cell to the second cell.

In some example embodiments, receiving the second control information comprises receiving a message comprising the second control information and a handover command, the handover command indicating an identity of the second cell for the handover.

In some example embodiments, the method 700 further comprises transmitting, to the third device, an indication that the session of the small data transmission was ongoing in the first cell.

In some example embodiments, transmitting the first information comprises determining whether mobility during a small data transmission procedure is allowed, the mobility during small data transmission procedure representing a switch of the first device from the first cell while the session of the small data transmission is ongoing; and in response to a determination that the mobility during the small data transmission procedure is allowed, transmitting the first information indicating the intention of cell reselection.

In some example embodiments, determining whether the mobility during the small data transmission procedure is allowed comprises receiving, from the second device, configuration information associated with the mobility during the small data transmission procedure, the configuration information comprising information relating to at least one of: an indication of whether the mobility during the small data transmission procedure is allowed for the first device, an indication of whether the mobility during the small data transmission procedure is supported by the second device, at least one cell in which the mobility during the small data transmission procedure is allowed, at least one device by which the mobility during the small data transmission procedure is allowed, an area in which the mobility during the small data transmission procedure is supported, and an indication of whether the small data transmission procedure is restricted to the first cell; and determining whether the mobility during the small data transmission procedure is allowed based on the configuration information.

In some example embodiments, the method 700 further comprises receiving, from the second device, an indication of whether a small data transmission is restricted to the first cell; and in accordance with a determination that the indication indicates that the small data transmission is not restricted to the first cell, performing the small data transmission in the second cell after switching to the second cell.

Figure 8:
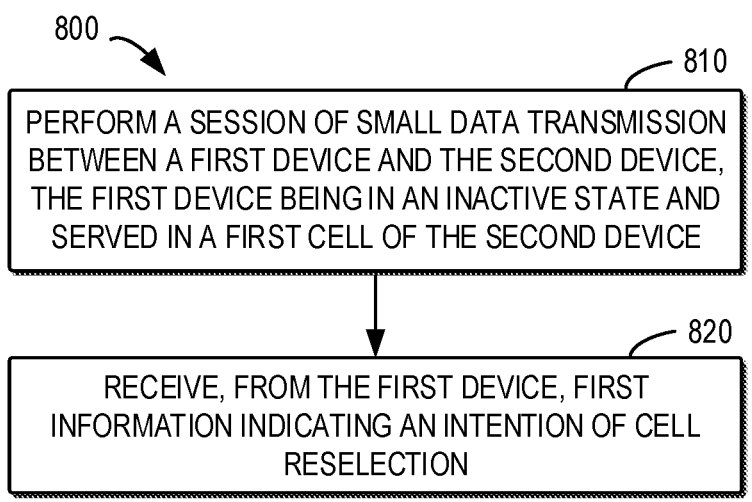
FIG. 8 illustrates a flowchart of a method implemented at a second device in accordance with some example embodiments of the present disclosure.

FIG. 8 illustrates a flowchart of a method 800 implemented at a second device in accordance with some embodiments of the present disclosure. For the purpose of discussion, the method 800 will be described from the perspective of the second device 120 with reference to FIG. 1.

At block 810, the second device performs a session of small data transmission between a first device and the second device. The first device is in an inactive state and served in a first cell of the second device. At block 820, the second device receives, from the first device, first information indicating an intention of cell reselection.

In some example embodiments, the first information comprises at least one of: an identity of a second cell to be re-selected by the first device, an indication that the potential cell reselection criterion is satisfied, and an indication of whether the inactive state or a connected state is preferred by the first device.

In some example embodiments, the method 800 further comprises transmitting, to the first device, second information for switching the first device from the first cell to a second cell of a third device.

In some example embodiments, transmitting the second information comprises transmitting, to the first device, first control information to instruct the first device to maintain the inactive state.

In some example embodiments, transmitting the second information comprises transmitting, to the first device, a security configuration to be used in communication with the second cell.

In some example embodiments, transmitting the second information comprises transmitting, to the first device, a suspending configuration to suspend a connection over which the session of the small data transmission is transmitted.

In some example embodiments, transmitting the second information comprises transmitting second control information to instruct the first device to transition from the inactive state to a connected state.

In some example embodiments, transmitting the second control information comprises transmitting a message comprising the second control information and a handover command, the handover command indicating an identity of the second cell for a handover from the first cell to the second cell.

In some example embodiments, the method 800 further comprises transmitting, to the first device, configuration information associated with mobility during a small data transmission procedure, the configuration information comprising information relating to at least one of: an indication of whether the mobility during the small data transmission procedure is allowed for the first device, an indication of whether the mobility during the small data transmission procedure is supported by the second device, at least one cell in which the mobility during the small data transmission procedure is allowed, at least one device by which the mobility during the small data transmission procedure is allowed, an area in which the mobility during the small data transmission procedure is supported, and an indication of whether the small data transmission procedure is restricted to the first cell.

In some example embodiments, the method 800 further comprises transmitting, to a first device, an indication of whether a small data transmission is restricted to the first cell.

Figure 9:
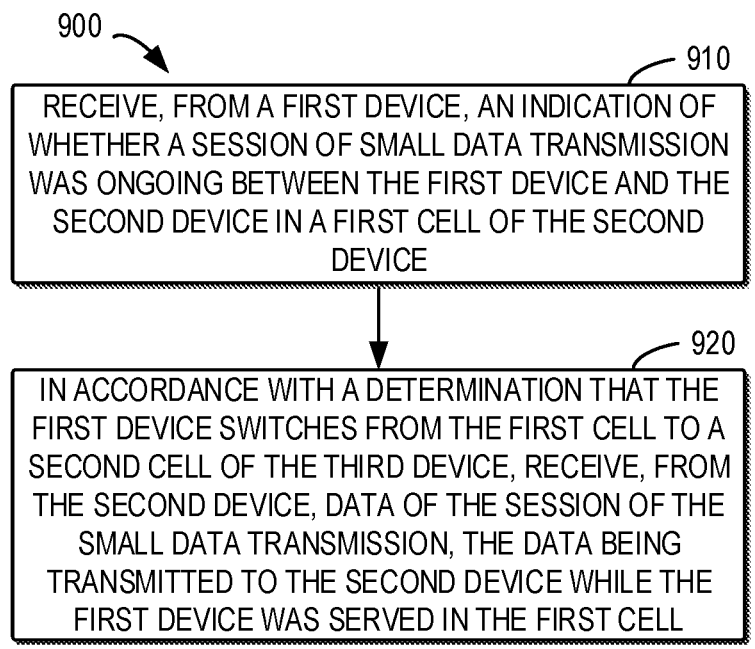
FIG. 9 illustrates a flowchart of a method implemented at a third device in accordance with some other example embodiments of the present disclosure.

FIG. 9 illustrates a flowchart of a method 900 implemented at a third device in accordance with some other embodiments of the present disclosure. For the purpose of discussion, the method 900 will be described from the perspective of the third device 130 with reference to FIG. 1.

At block 910, the third device receive, from a first device, an indication of whether a session of small data transmission was ongoing between the first device and the second device in a first cell of the second device. At block 920, the third device in accordance with a determination that the first device switches from the first cell to a second cell of the third device, receive, from the second device, data of the session of the small data transmission. The data is transmitted to the second device while the first device was served in the first cell.

In some example embodiments, receiving the indication comprises receiving, from the first device, a medium access control control element message or a radio resource control message comprising the indication.

In some example embodiments, switching to the second cell via cell reselection, and the method 900 further comprise receive, from the first device, a resume request for resuming the session of the small data transmission in the second cell.

Example Apparatuses

In some embodiments, a first apparatus capable of performing any of the method 700 (for example, the first device 110) may comprise means for performing the respective steps of the method 700. The means may be implemented in any suitable form. For example, the means may be implemented in a circuitry or software module.

In some embodiments, the first apparatus comprises means for performing a session of small data transmission between the first apparatus and a second apparatus, the first apparatus is in an inactive state and served in a first cell of the second apparatus; means for determining whether a potential cell reselection criterion is satisfied when the session of small data transmission is ongoing; and means for in accordance with a determination that a potential cell reselection criterion is satisfied, transmitting, to the second apparatus, first information indicating an intention of cell reselection.

In some example embodiments, the first information comprises at least one of: an identity of a second cell to be re-selected by the first apparatus, an indication that the potential cell reselection criterion is satisfied, and an indication of whether the inactive state or a connected state is preferred by the first apparatus.

In some example embodiments, the first apparatus further comprises means for receiving, from the second apparatus, second information for switching from the first cell to a second cell of a third apparatus; and means for switching from the first cell to the second cell based on the second information.

In some example embodiments, the means for receiving the second information comprises means for receiving, from the second apparatus, first control information to instruct the first apparatus to maintain the inactive state, and means for switching from the first cell to the second cell comprises means for performing cell reselection from the first cell to the second cell while the first apparatus remains in the inactive state.

In some example embodiments, means for receiving the second information comprises means for receiving, from the second apparatus, a security configuration to be used in communication with the second cell.

In some example embodiments, means for receiving the second information comprises means for receiving, from the second apparatus, a suspending configuration to suspend a connection over which the session of the small data transmission is transmitted, and the first apparatus further comprises means for transmitting, to the third apparatus, a resume request for resuming the session of the small data transmission in the second cell.

In some example embodiments, means for receiving the second information comprises means for receiving second control information to instruct the first apparatus to transition from the inactive state to a connected state, and means for switching from the first cell to the second cell comprises performing a state transition from the inactive state to the connected state, and means for performing a handover from the first cell to the second cell.

In some example embodiments, means for receiving the second control information comprises means for receiving a message comprising the second control information and a handover command, the handover command indicating an identity of the second cell for the handover.

In some example embodiments, the first apparatus further comprises means for transmitting, to the third apparatus, an indication that the session of the small data transmission was ongoing in the first cell.

In some example embodiments, means for transmitting the first information comprises means for determining whether mobility during a small data transmission procedure is allowed, the mobility during small data transmission procedure representing a switch of the first apparatus from the first cell while the session of the small data transmission is ongoing; and means for in response to a determination that the mobility during the small data transmission procedure is allowed, transmitting the first information indicating the intention of cell reselection.

In some example embodiments, means for determining whether the mobility during the small data transmission procedure is allowed comprises means for receiving, from the second apparatus, configuration information associated with the mobility during the small data transmission procedure, the configuration information comprising information relating to at least one of: an indication of whether the mobility during the small data transmission procedure is allowed for the first apparatus, an indication of whether the mobility during the small data transmission procedure is supported by the second apparatus, at least one cell in which the mobility during the small data transmission procedure is allowed, at least one apparatus by which the mobility during the small data transmission procedure is allowed, an area in which the mobility during the small data transmission procedure is supported, and an indication of whether the small data transmission procedure is restricted to the first cell, and determining whether the mobility during the small data transmission procedure is allowed based on the configuration information.

In some example embodiments, the first apparatus further comprises means for receiving, from the second apparatus, an indication of whether a small data transmission is restricted to the first cell; and means for in accordance with a determination that the indication indicates that the small data transmission is not restricted to the first cell, performing the small data transmission in the second cell after switching to the second cell.

In some embodiments, a second apparatus capable of performing any of the method 800 (for example, the second device 120) may comprise means for performing the respective steps of the method 800. The means may be implemented in any suitable form. For example, the means may be implemented in a circuitry or software module.

In some example embodiments, the second apparatus comprises: means for performing a session of small data transmission between a first apparatus and the second apparatus, the first apparatus being in an inactive state and served in a first cell of the second apparatus; and means for receiving, from the first apparatus, first information indicating an intention of cell reselection.

In some example embodiments, the first information comprises at least one of: an identity of a second cell to be re-selected by the first apparatus, an indication that the potential cell reselection criterion is satisfied, and an indication of whether the inactive state or a connected state is preferred by the first apparatus.

In some example embodiments, the second apparatus further comprises means for transmitting, to the first apparatus, second information for switching the first apparatus from the first cell to a second cell of a third apparatus.

In some example embodiments, means for transmitting the second information comprises means for transmitting, to the first apparatus, first control information to instruct the first apparatus to maintain the inactive state.

In some example embodiments, means for transmitting the second information comprises means for transmitting, to the first apparatus, a security configuration to be used in communication with the second cell.

In some example embodiments, means for transmitting the second information comprises means for transmitting, to the first apparatus, a suspending configuration to suspend a connection over which the session of the small data transmission is transmitted.

In some example embodiments, means for transmitting the second information comprises transmitting second control information to instruct the first apparatus transition from the inactive state to a connected state.

In some example embodiments, means for transmitting the second control information comprises means for transmitting a message comprising the second control information and a handover command, the handover command indicating an identity of the second cell for a handover from the first cell to the second cell.

In some example embodiments, the second apparatus further comprises means for transmitting, to the first apparatus, configuration information associated with mobility during a small data transmission procedure, the configuration information comprising information relating to at least one of: an indication of whether the mobility during the small data transmission procedure is allowed for the first apparatus, an indication of whether the mobility during the small data transmission procedure is supported by the second apparatus, at least one cell in which the mobility during the small data transmission procedure is allowed, at least one apparatus by which the mobility during the small data transmission procedure is allowed, an area in which the mobility during the small data transmission procedure is supported, and an indication of whether the small data transmission procedure is restricted to the first cell.

In some example embodiments, the second apparatus further comprises means for transmitting, to a first apparatus, an indication of whether a small data transmission is restricted to the first cell.

In some embodiments, a third apparatus capable of performing any of the method 900 (for example, the third device 130) may comprise means for performing the respective steps of the method 900. The means may be implemented in any suitable form. For example, the means may be implemented in a circuitry or software module.

In some example embodiments, the third apparatus comprises: means for receiving, from a first apparatus, an indication of whether a session of small data transmission was ongoing between the first apparatus and the second apparatus in a first cell of the second apparatus; and means for in accordance with a determination that the first apparatus switches from the first cell to a second cell of the third apparatus, receive, from the second apparatus, data of the session of the small data transmission, the data being transmitted to the second apparatus while the first apparatus was served in the first cell.

In some example embodiments, means for receiving the indication comprises means for receiving, from the first apparatus, a medium access control control element message or a radio resource control message comprising the indication.

In some example embodiments, means for switching to the second cell via cell reselection, and the third apparatus further comprises means for receiving, from the first apparatus, a resume request for resuming the session of the small data transmission in the second cell.

Example Device and Computer Readable Medium

Figure 10:
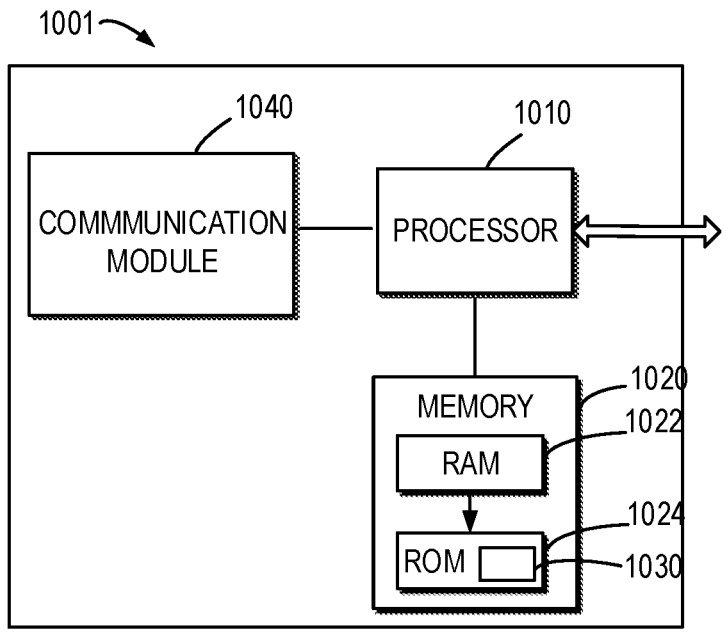
FIG. 10 illustrates a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement the communication device, for example the first device 110, the second device 120 or the third device 130 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1024. The processor 1010 may perform any suitable actions and processing by loading the program 1030 into the RAM 1022.

The embodiments of the present disclosure may be implemented by means of the program 1030 so that the device 1000 may perform any process of the disclosure as discussed with reference to FIGS. 2 to 5. The embodiments of the present disclosure may also be implemented by hardware or by a combination of software and hardware.

Figure 11:
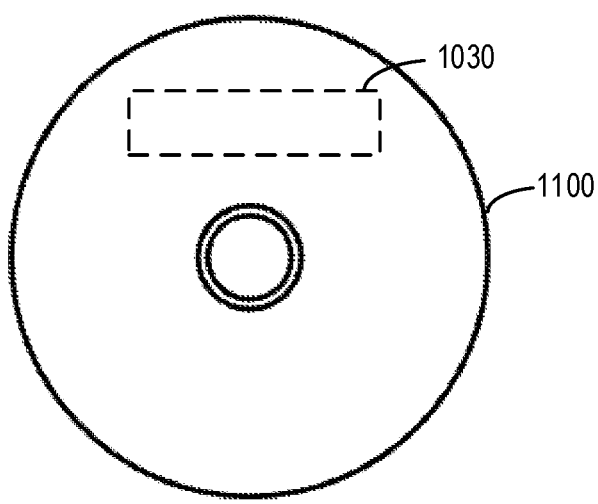
FIG. 11 illustrates a block diagram of an example computer readable medium in accordance with some example embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700-900 as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
   at least one processor; and
   at least one memory including computer program code;
   the at least one memory and the computer program code are configured to, with the at least one processor, cause the terminal device to:
   perform a session of small data transmission between the terminal device and a serving network device, the terminal device being in an inactive state and served in a first cell of the serving network device;
   determine whether a potential cell reselection criterion is satisfied when the session of small data transmission is ongoing; and
   in accordance with a determination that a potential cell reselection criterion is satisfied, transmit, to the serving network device, first information indicating an intention of cell reselection,
   wherein the first information comprises:
   an identity of a second cell to be re-selected by the terminal device, and
   an indication of whether the inactive state or a connected state is preferred by the terminal device,
   wherein the terminal device is further caused to:
   receive, from the serving network device, second information for switching from the first cell to a second cell of a target network device; and
   switch from the first cell to the second cell based on the second information,
   wherein the terminal device is caused to receive the second information by:
   receiving, from the serving network device, first control information to instruct the terminal device to maintain the inactive state, and
   wherein the terminal device is caused to switch from the first cell to the second cell by:
   performing cell reselection from the first cell to the second cell while the terminal device remains in the inactive state,
   wherein the terminal device is further caused to receive the second information by:
   receiving, from the serving network device, a suspending configuration to suspend a connection over which the session of the small data transmission is transmitted, and
   wherein the terminal device is further caused to:
   transmit, to the target network device, a resume request for resuming the session of the small data transmission in the second cell.

2. The terminal device of claim 1, wherein transmission of the first information is triggered before an actual cell reselection criterion is satisfied, based on a separate offset threshold defined for a potential cell reselection criterion.

3. The terminal device of claim 1, wherein the potential cell reselection criterion is determined based on at least one of: reference-signal received power (RSRP), reference-signal received quality (RSRQ), or signal-to-interference-plus-noise ratio (SINR) at the terminal device.

4. The terminal device of claim 1, wherein the indication of whether the inactive state or the connected state is preferred is included in user-equipment assistance information contained in a radio-resource-control (RRC) message.

5. The terminal device of claim 1, wherein the terminal device is caused to receive the second information further by:
   receiving, from the serving network device, a security configuration to be used in communication with the second cell.

6. The terminal device of claim 1 wherein in response to the first information, the serving network device performs unified access control (UAC) handling to determine whether the terminal device is permitted to perform cell reselection during the small-data transmission procedure.

7. The terminal device of claim 1, wherein the terminal device is caused to receive the second information by:
   receiving second control information to instruct the terminal device to transition from the inactive state to a connected state, and
   wherein the terminal device is caused to switch from the first cell to the second cell by:

performing a state transition from the inactive state to the connected state, and performing a handover from the first cell to the second cell, and wherein the terminal device is further caused to determine a time window to defer transmission of the first information so as to reduce signaling overhead and power consumption during the small-data transmission procedure.

8. The terminal device of claim 7, wherein the first terminal device is caused to receive the second control information:

wherein the security configuration comprises at least an inactive-radio network temporary identity (I-RNTI) and a NextHopChainingCount (NCC).

9. The terminal device of claim 1, the first terminal device is further caused to transmit the first information by:

determining whether mobility during a small data transmission procedure is allowed, the mobility during the small data transmission procedure representing a switch of the terminal device from the first cell while the session of the small data transmission is ongoing; and in response to a determination that the mobility during the small data transmission procedure is allowed, transmitting the first information indicating the intention of cell reselection, wherein the resume request comprises a resume ID of the first cell and cell identifiers of both the first and second cells.

10. The terminal device of claim 1, wherein the terminal device is further caused to: receive, from the serving network device, an indication of whether a small data transmission is restricted to the first cell; and in accordance with a determination that the indication indicates that the small data transmission is not restricted to the first cell, perform the small data transmission in the second cell after switching to the second cell, wherein the terminal device is further caused to receive, from the serving network device, an indication of whether small-data transmission is restricted to the first cell, and in accordance with a determination that the indication indicates not restricted, the terminal device performs the small-data transmission in the second cell after switching thereto.

11. A serving network device, comprising:
at least one processor; and
at least one memory including computer program code;
the at least one memory and the computer program code are configured to, with the at least one processor, cause the serving network device to:

perform a session of small data transmission between a terminal device and the serving network device, the terminal device being in an inactive state and served in a first cell of the serving network device; and receive, from the terminal device, first information indicating an intention of cell reselection, wherein the first information comprises:

an identity of a second cell to be re-selected by the terminal device, and an indication of whether the inactive state or a connected state is preferred by the terminal device, wherein the serving network device is further caused to: transmit, to the terminal device, second information for switching the terminal device from the first cell to a second cell of a target network device, wherein the serving network device is caused to transmit the second information by: transmitting, to the terminal device, first control information to instruct the terminal device to maintain the inactive state, wherein the serving network device is caused to transmit the second information by:

transmitting second control information to instruct the terminal device to transition from the inactive state to a connected state, and wherein the serving network device is further caused to: transmit, to a terminal device, an indication of whether a small data transmission is restricted to the first cell.

12. The serving network device of claim 11, wherein the serving network device is further caused to: transmit, to the terminal device, configuration information associated with mobility during a small data transmission procedure, the configuration information comprising information relating to at least:

an indication of whether the mobility during the small data transmission procedure is allowed for the terminal device, an indication of whether the mobility during the small data transmission procedure is supported by the serving network device, at least one cell in which the mobility during the small data transmission procedure is allowed, at least one device by which the mobility during the small data transmission procedure is allowed, and an area in which the mobility during the small data transmission procedure is supported, and an indication of whether the small data transmission procedure is restricted to the first cell.

* * * * *